(12) United States Patent
Qumei

(10) Patent No.: US 7,975,147 B1
(45) Date of Patent: Jul. 5, 2011

(54) ELECTRONIC DEVICE NETWORK SUPPORTING ENCIPHERING AND DECIPHERING AND UPDATE GENERATION IN ELECTRONIC DEVICES

(75) Inventor: Iyad Qumei, Huntington Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2309 days.

(21) Appl. No.: 10/813,212

(22) Filed: Mar. 30, 2004

Related U.S. Application Data

(60) Provisional application No. 60/459,091, filed on Mar. 31, 2003.

(51) Int. Cl.
*G06F 11/30* (2006.01)
*G06F 12/14* (2006.01)
*H04L 9/08* (2006.01)
*H04M 3/00* (2006.01)

(52) U.S. Cl. ........ 713/193; 380/281; 380/282; 380/283; 380/285; 455/418; 455/419; 713/191

(58) Field of Classification Search .................. None
See application file for complete search history.

(56) References Cited

U.S. PATENT DOCUMENTS

| | | | |
|---|---|---|---|
| 5,084,816 A | 1/1992 | Boese et al. | |
| 5,261,055 A | 11/1993 | Moran et al. .................. | 395/275 |
| 5,442,771 A | 8/1995 | Filepp et al. .................. | 395/650 |
| 5,479,637 A | 12/1995 | Lisimaque et al. ............ | 395/430 |
| 5,579,522 A | 11/1996 | Christeson et al. ........... | 395/652 |
| 5,596,738 A | 1/1997 | Pope .............................. | 395/430 |
| 5,598,534 A | 1/1997 | Haas ......................... | 395/200.09 |
| 5,608,910 A | 3/1997 | Shimakura ................... | 395/670 |
| 5,623,604 A | 4/1997 | Russell et al. ............. | 395/200.1 |
| 5,666,293 A | 9/1997 | Metz et al. .................. | 395/200.5 |
| 5,752,039 A | 5/1998 | Tanimura ...................... | 395/712 |
| 5,778,440 A | 7/1998 | Yiu et al. ...................... | 711/154 |
| 5,790,974 A | 8/1998 | Tognazzini ................... | 701/204 |
| 5,878,256 A | 3/1999 | Bealkowski et al. ......... | 395/652 |
| 5,960,445 A | 9/1999 | Tamori et al. ................. | 707/203 |
| 5,968,182 A | 10/1999 | Chen et al. | |
| 6,009,497 A | 12/1999 | Wells et al. ................... | 711/103 |

(Continued)

FOREIGN PATENT DOCUMENTS

CA      2339923      3/2000

(Continued)

OTHER PUBLICATIONS

"Focus on OpenView a guide to Hewlett-Packard's Network and Systems Management Platform", Nathan J. Muller, pp. 1-291, CBM Books, published 1995.

(Continued)

*Primary Examiner* — Shin-Hon Chen

(57) ABSTRACT

Disclosed herein is an electronic device network having a plurality of associated electronic devices. The electronic devices may include an update agent adapted to decipher code and/or data segments. The update agent may also be adapted to modify and/or upgrade firmware and/or software components resident in the electronic devices by employing the deciphered code and/or data segments along with contents of an update. An update generator, resident in the electronic devices may employ deciphering techniques to the code and/or date segments to extract enciphered code and/or data segments. The update generator may also process the code and/or data segments to generate an update including difference information. The update generator may also be adapted to encipher difference information in the generated update.

41 Claims, 7 Drawing Sheets

Generator Updating Firmware Images Using Ciphered Firmware Images

U.S. PATENT DOCUMENTS

| | | | |
|---|---|---|---|
| 6,018,747 A | 1/2000 | Burns et al. | |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,138,249 A | 10/2000 | Nolet | |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,209,127 B1 | 3/2001 | Mori et al. | |
| 6,230,316 B1* | 5/2001 | Nachenberg | 717/169 |
| 6,279,153 B1 | 8/2001 | Bi et al. | 717/11 |
| 6,301,710 B1 | 10/2001 | Fujiwara | |
| 6,311,322 B1 | 10/2001 | Ikeda et al. | 717/1 |
| 6,343,379 B1 | 1/2002 | Ozawa et al. | |
| 6,381,740 B1 | 4/2002 | Miller et al. | |
| 6,408,434 B1 | 6/2002 | Fujiwara | |
| 6,438,585 B2 | 8/2002 | Mousseau et al. | 709/206 |
| 6,526,574 B1 | 2/2003 | Jones | |
| 6,615,038 B1 | 9/2003 | Moles et al. | |
| 6,615,404 B1 | 9/2003 | Garfunkel et al. | |
| 6,668,336 B2 | 12/2003 | Lasser | |
| 6,725,056 B1 | 4/2004 | Moles et al. | |
| 6,725,392 B1 | 4/2004 | Frey et al. | |
| 6,832,373 B2 | 12/2004 | O'Neill | |
| 6,836,657 B2 | 12/2004 | Ji et al. | |
| 6,925,467 B2 | 8/2005 | Gu et al. | |
| 6,928,108 B2 | 8/2005 | Nelson et al. | |
| 7,095,858 B2* | 8/2006 | Wagner et al. | 380/281 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0072359 A1 | 6/2002 | Moles et al. | |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0023964 A1 | 1/2003 | Rajaram et al. | |
| 2003/0027563 A1 | 2/2003 | Herle et al. | |
| 2003/0033599 A1 | 2/2003 | Rajaram et al. | 717/173 |
| 2003/0037075 A1 | 2/2003 | Hannigan et al. | 707/500 |
| 2003/0051160 A1* | 3/2003 | Selkirk et al. | 713/201 |
| 2003/0061384 A1 | 3/2003 | Nakatani | 709/245 |
| 2003/0074658 A1 | 4/2003 | Kim | |
| 2003/0084435 A1 | 5/2003 | Messer et al. | |
| 2003/0121032 A1 | 6/2003 | Cho et al. | |
| 2003/0162533 A1 | 8/2003 | Moles et al. | |
| 2003/0186689 A1 | 10/2003 | Herle et al. | |
| 2004/0006703 A1* | 1/2004 | Kitani et al. | 713/193 |
| 2004/0015952 A1 | 1/2004 | Lajoie et al. | |
| 2004/0031031 A1 | 2/2004 | Rudelic | |
| 2004/0034853 A1 | 2/2004 | Gibbons et al. | |
| 2004/0054995 A1 | 3/2004 | Lee | |
| 2004/0111723 A1 | 6/2004 | Moles et al. | |
| 2004/0117785 A1 | 6/2004 | Kincaid | |
| 2004/0133887 A1 | 7/2004 | Herle et al. | |
| 2004/0152455 A1 | 8/2004 | Herle | |
| 2004/0261072 A1 | 12/2004 | Herle | |
| 2004/0261073 A1 | 12/2004 | Herle et al. | |
| 2005/0060699 A1 | 3/2005 | Kim et al. | |
| 2005/0097544 A1 | 5/2005 | Kim | |
| 2005/0144609 A1 | 6/2005 | Rothman et al. | |
| 2005/0144612 A1 | 6/2005 | Wang et al. | |
| 2005/0160195 A1 | 7/2005 | Bruner et al. | |
| 2005/0216902 A1 | 9/2005 | Schafer | |
| 2005/0216903 A1 | 9/2005 | Schafer | |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Computer Dictionary Microsoft Press Third Edition, pp. 88, 190, 1997.

* cited by examiner

Firmware Build Process Incorporating Ciphering

Firmware Generator Updating Firmware Images

Generator Updating Firmware Images Using Ciphered Firmware Images

Modified Update Agent Fault Tolerant Procedure Managing Ciphered Firmware Images

ELECTRONIC DEVICE NETWORK SUPPORTING ENCIPHERING AND DECIPHERING AND UPDATE GENERATION IN ELECTRONIC DEVICES

CROSS-REFERENCE TO OTHER APPLICATIONS

The present application claims the benefit of priority of U.S. Provisional Patent Application having Ser. No. 60/459,091, filed on Mar. 31, 2003, and hereby incorporates herein by reference the complete subject matter thereof, in its entirety.

The present application also hereby incorporates herein by reference the complete subject matter of PCT Application having publication number WO 02/41147 A1, and having application number PCT/US01/44034, filed on Nov. 19, 2001, in its entirety.

The present application also hereby incorporates herein by reference the complete subject matter of U.S. Provisional Patent Application having Ser. No. 60/249,606, filed Nov. 17, 2000, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions (updates) of the firmware and software are periodically made available to fix the bugs, introduce new features, delete features, etc.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in an electronic device network for updating at least one of firmware and software in a plurality of electronic devices using at least one electronic device update. At least one of the firmware and software in the plurality of electronic devices and the at least one update may be encrypted. The network may comprise at least one update generator adapted to generate updates. The at least one update generator may comprise an encrypting and decrypting engine. The network may also comprise at least one update store storing a plurality of electronic device updates, and at least one update delivery server adapted to dispense the plurality of electronic device updates.

In an embodiment according to the present invention, the at least one update delivery server may comprise secure sockets layer support providing authentication and data encryption/decryption.

In an embodiment according to the present invention, each of the plurality of electronic devices may be adapted to retrieve secure encrypted updates from the at least one update delivery server to update the at least one of firmware and software resident in the plurality of electronic devices. At least a portion of the at least one of firmware and software resident in the electronic devices may be encrypted.

In an embodiment according to the present invention, each of the plurality of electronic devices may comprise one of encrypting and decrypting components, and a client for downloading updates.

In an embodiment according to the present invention, each of the plurality of electronic devices may comprise a security services component providing secure communication with the at least one update delivery server.

In an embodiment according to the present invention, each of the plurality of electronic devices may comprise an encrypted section. The encrypted section may comprise at least one of an encrypted data section and an encrypted code section.

In an embodiment according to the present invention, each of the plurality of electronic devices may comprise at least one of a random access memory, a provisioned data section, an operating system, an update agent, and an update application loader. The provisioned data section may comprise an update agent provisioning information section and a number assignment module.

In an embodiment according to the present invention, the update agent may be adapted to employ at least one of encrypting and decrypting components to update at least one of firmware and software resident in the electronic devices. At least a portion of the at least one of firmware and software may be encrypted and stored in one of an encrypted data section and an encrypted code section.

In an embodiment according to the present invention, the update generator may be adapted to process an old memory image and a new memory image of the at least one of firmware and software in the electronic devices. At least a portion of the at least one of firmware and software may be encrypted.

In an embodiment according to the present invention, the update generator may be adapted to decipher one of encrypted data segments and encrypted code in both an old memory image and a new memory image to generate an update for updating at least one of firmware and software in the electronic devices.

In an embodiment according to the present invention, the update generator may be adapted to employ deciphering techniques to extract one of enciphered code and enciphered data segments, process the one of enciphered code and enciphered data segments to generate an update comprising difference information, and encipher the one of code and data segments, and the difference information in at least one update.

In an embodiment according to the present invention, the electronic devices may comprise a plurality of mobile electronic devices. The plurality of mobile electronic devices may comprise at least one of a mobile cellular phone handset, personal digital assistant, pager, a multimedia player, and a camera.

Aspects of the present invention may be found in a method of encrypting update information within a firmware image in electronic devices. The method may comprise creating encrypted updates for an electronic device using binary differencing information, and encrypting firmware images by applying at least one of stream symmetric enciphering and block symmetric enciphering.

In an embodiment according to the present invention, stream symmetric enciphering may be performed in a byte by byte manner. Update information may be processed using a key stream to produce an encrypted update.

In an embodiment according to the present invention, stream symmetric enciphering may further comprise an $i^{th}$ byte of the key stream operating on a byte of the update information produce an $i^{th}$ cipher encrypted byte.

In an embodiment according to the present invention, the $i^{th}$ cipher encrypted byte may be decrypted by the $i^{th}$ byte of the key stream operating on the $i^{th}$ cipher encrypted byte to reproduce an original $i^{th}$ byte of update information.

In an embodiment according to the present invention, block symmetric enciphering may be performed upon blocks of data. The blocks of data may comprise a predetermined number of bytes. A key block may applied to an update information block to produce an encrypted block. Block symmetric enciphering may be performed by cipher block chaining.

In an embodiment according to the present invention, the predetermined number of bytes in the blocks of data may comprise 8-16 bytes.

In an embodiment according to the present invention, block symmetric enciphering may be enabled to accommodate variable block sizes. Block sizes may at least be one of expanded and padded. Padding may be one of added and removed to vary the block sizes during a ciphering process.

In an embodiment according to the present invention, an enciphering algorithm and an enciphering key may be stored in the electronic devices.

In an embodiment according to the present invention, the electronic devices may comprise a plurality of mobile electronic devices. The plurality of mobile electronic devices may comprise at least one of a mobile cellular phone handset, personal digital assistant, pager, multimedia player, and a camera.

Aspects of the present invention may be found in an electronic device employing one of encrypting and decrypting techniques to update firmware and software. The electronic device may comprise random access memory and non-volatile memory. The non-volatile memory may comprise an update agent, a first in first out (FIFO) memory device, a firmware, a software application, and an update. The electronic device may be adapted to be updated by performing the update upon at least one of the firmware and the software application selected for updating.

In an embodiment according to the present invention, the at least one of the firmware and the software application selected for updating in the electronic device may be at least partially encrypted.

In an embodiment according to the present invention, the electronic device may be adapted to retrieve secure encrypted updates from an update delivery server to update at least one of the firmware and the software application selected for updating resident in the electronic device.

In an embodiment according to the present invention, the electronic device may comprise at least one of encrypting and decrypting components and a client for facilitating downloading updates.

In an embodiment according to the present invention, the electronic device may comprise a security services component providing secure communication with an update delivery server.

In an embodiment according to the present invention, the electronic device may comprise an encrypted section. The encrypted section may comprise at least one of an encrypted data section and an encrypted code section.

In an embodiment according to the present invention, the electronic device may further comprise at least one of a provisioned data section, an operating system, an update agent, and an update application loader. The provisioned data section may comprise an update agent provisioning information section and a number assignment module.

In an embodiment according to the present invention, the update agent may be adapted to employ at least one of encrypting and decrypting components to update at least one of firmware and software application resident in the electronic device. At least a portion of the at least one of firmware and software application may be encrypted and stored in one of an encrypted data section and an encrypted code section.

In an embodiment according to the present invention, the electronic device may comprise a plurality of mobile electronic devices. The plurality of mobile electronic devices may comprise at least one of a mobile cellular phone handset, personal digital assistant, pager, multimedia player, and a camera.

Aspects of the present invention may be found in a method of building a firmware upgrade for use in an electronic device incorporating encryption. The method may comprise building a firmware image to be encrypted. The firmware image may comprise a plurality of components. The method may also comprise encrypting the components before assembling the components into an encrypted firmware image.

In an embodiment according to the present invention, the method may further comprise generating binary difference information between firmware versions undergoing an upgrade and using an un-encrypted firmware image to generate the binary difference information. As the upgrade is being applied to an encrypted firmware image, uncorrelated information may be decrypted.

In an embodiment according to the present invention, the method may further comprise creating a data update package. The data update package may be based upon un-encrypted binary images.

In an embodiment according to the present invention, the method may further comprising creating a data update package. The data update package may be based upon encrypted binary images.

In an embodiment according to the present invention, the method may further comprising at least one of managing encrypted information by performing a pre-check analysis, managing encrypted information by performing a check-recovery analysis, and managing encrypted information by performing a fault tolerant procedure.

In an embodiment according to the present invention, during at least one of the pre-check analysis and the check recovery analysis, a cyclic redundancy check of a firmware image block may be compared against an original image cyclic redundancy check stored in a data update package. When ciphered data is present, the pre-check analysis may be performed upon the block to be decrypted before the cyclic redundancy check is calculated.

In an embodiment according to the present invention, cyclic redundancy check values for ciphered data may be stored in the data update package.

In an embodiment according to the present invention, during the fault tolerant procedure a ciphering algorithm may be applied to facilitate recovery of data for the upgrade.

In an embodiment according to the present invention, the method may further comprise decrypting an original data block and copying the decrypted data block to random access memory, applying update information to the random access memory, the update information comprising at least one of an update code and an update data segment from a data update package, combining the decrypted data block and the update information forming an update, encrypting the update information forming an encrypted update, sending the encrypted update to a storage unit, overwriting the original data block with the encrypted update, and processing every data block to be updated.

In an embodiment according to the present invention, a fault tolerant upgrade may comprise maintaining each original data block intact until the original data block is overwritten by an encrypted updated data block and maintaining a data update package intact throughout the fault tolerant upgrade.

In an embodiment according to the present invention, the electronic device may comprise a plurality of mobile electronic devices. The plurality of mobile electronic devices may comprise at least one of a mobile cellular phone handset, personal digital assistant, pager, multimedia player, and a camera.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

Aspects of the present invention may be found in a method of efficiently generating updates in electronic devices wherein at least a portion of content of the electronic device image is encrypted. Another aspect of the present invention may be found in a method of updating code and/or data segments in the electronic device when the code and/or data segments are encrypted. An aspect of the present invention may be found in determining what types of encrypted code and/or data segments may be updateable in the electronic device.

In an embodiment according to the present invention, it may be determined whether an update agent may be capable of updating all types of encrypted data and/or code segments resident in the electronic device. An aspect of the present invention may be found in an electronic device adapted to update encrypted firmware/software.

Electronic devices may be adapted to access servers to retrieve updates for updating at least one of firmware and software. The updates may be encrypted and/or the firmware/software being updated may be encrypted. An electronic device may be, for example, a mobile electronic device having software/firmware, such as, mobile cellular phone handsets, personal digital assistants (PDA's), pagers, multimedia players, cameras, etc.

An update may comprise firmware and software updates that modify or change the version of a particular firmware or software installed in an electronic device. For example, the updates may upgrade firmware/software to a newer version, repair a bug in the firmware/software, etc. An update may also add new services to the electronic device or delete services, as desired by a service provider, device manufacturer, or an end-user. The updates may be encrypted and/or the firmware/software being updated may be encrypted. An update and/or update package may comprise a set of executable program instructions for converting a first firmware/software version to a second firmware/software version.

Figure 1:
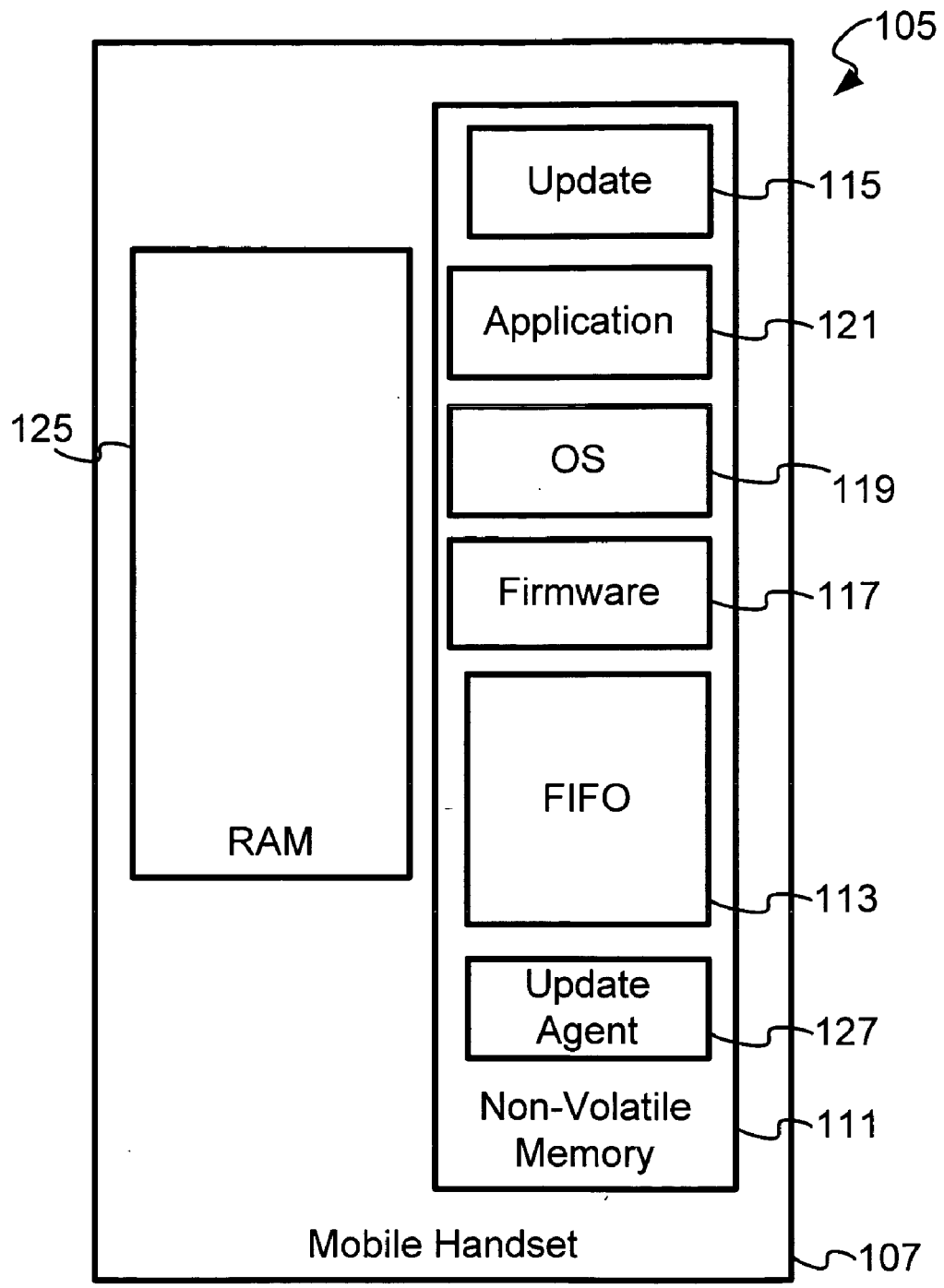
FIG. 1 is a block diagram illustrating an electronic device employing enciphering and deciphering techniques to update firmware and software in electronic devices in accordance with an embodiment of the present invention.

FIG. 1 is a block diagram illustrating an electronic device 105 employing enciphering and deciphering (encrypting and decrypting) techniques to update firmware and software in electronic devices in accordance with an embodiment of the present invention. In FIG. 1, the electronic device 105 may comprise a mobile handset 107, for example. The mobile handset 107 may comprise a random access memory (RAM) 125 and non-volatile memory 111.

The non-volatile memory 111 may comprise a plurality of components. For example, the non-volatile memory 111 may comprise an update agent 127, a first in first out (FIFO) memory device 113, a firmware 117, an operating system 119, an application (for example, a software application) 121, and an update 115. The electronic device 105 may be adapted to be updated by performing the update 115 upon the components (firmware/software) selected for update.

Figure 2:
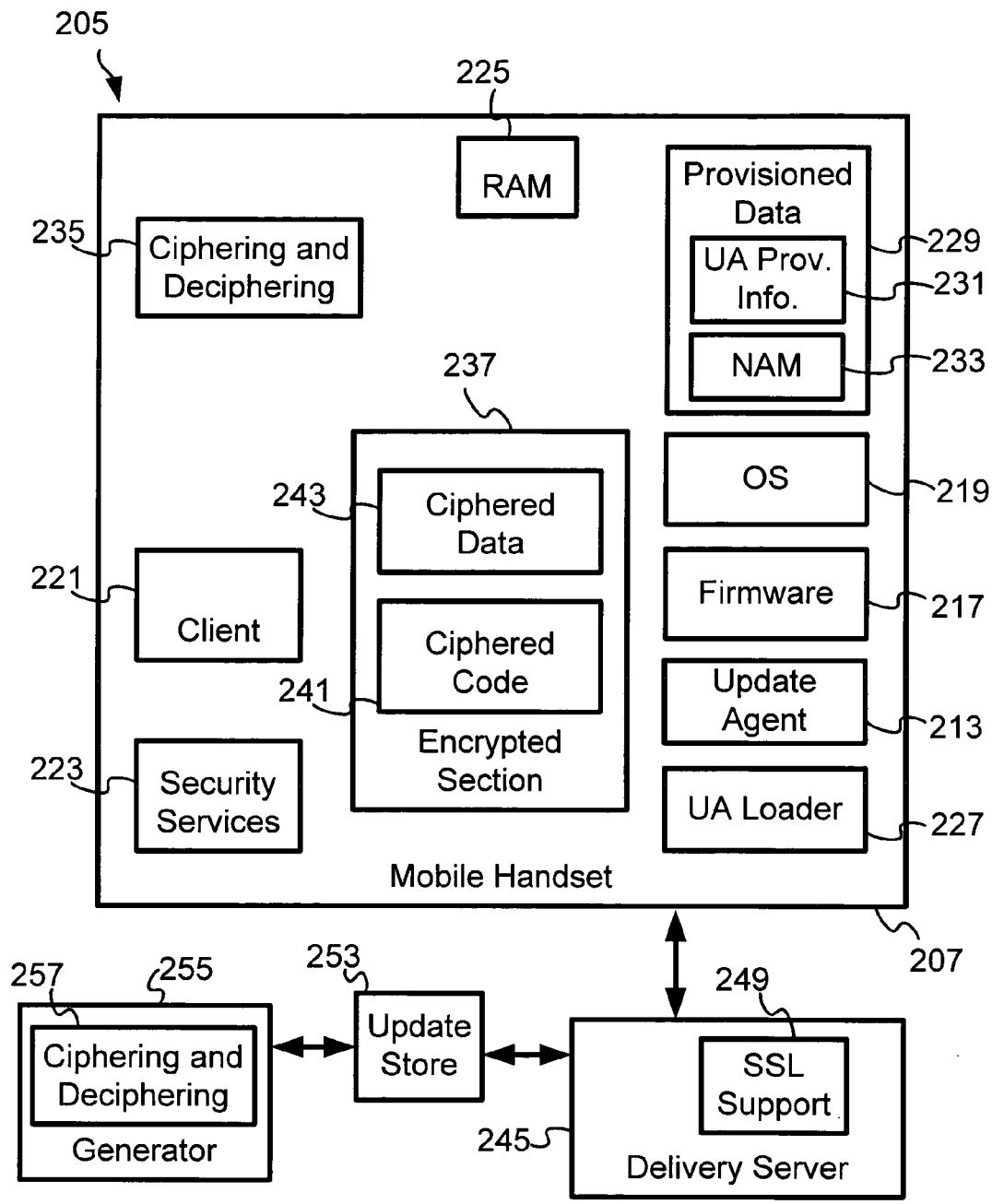
FIG. 2 is a block diagram illustrating an electronic device network employing enciphering and deciphering techniques to update firmware and software in electronic devices in accordance with an embodiment of the present invention.

FIG. 2 is a block diagram illustrating an electronic device network 205 employing enciphering and deciphering (encrypting and decrypting) techniques to update firmware and/or software in electronic devices, for example, mobile handset 207, in accordance with an embodiment of the present invention. FIG. 2 illustrates an electronic device network 205 that may employ in electronic devices enciphering and deciphering techniques to update firmware and/or software that are partially or entirely enciphered. The updates may also be encrypted.

The electronic device network 205 may comprise an update generator 255 adapted to generate updates that may be employed to update firmware/software in electronic devices, for example, mobile handset 207. In an embodiment according to the present invention, the update generator 255 may comprise a ciphering/enciphering and deciphering (encrypting and decrypting) engine 257. The electronic device network 205 may also comprise an update store 253 storing a plurality of electronic device updates.

The electronic device network 205 may also comprise a delivery server 245 adapted to dispense the plurality of electronic device updates. The delivery server 245 may also comprise secure sockets layer (SSL) support 249 providing authentication and data encryption/decryption in an embodiment according to the present invention. The electronic device network 205 may also comprise a plurality of electronic devices, for example, mobile handset 207. The plurality of electronic devices may be adapted to retrieve secure encrypted updates from delivery server 245 to update firmware/software resident in the electronic devices, wherein at least a portion of the firmware/software resident in the electronic devices may be enciphered/encrypted.

In an embodiment according to the present invention, the electronic devices, for example, mobile handset 207, may comprise ciphering/enciphering and deciphering (encrypting and decrypting) components 235 and a client 221 for facilitating downloading updates. The electronic devices, for example, mobile handset 207, may also comprise a security services component 223 providing secure communication with delivery server 245. The electronic devices, for example, mobile handset 207, may also comprise an encrypted section 237. The encrypted section 237 may also comprise a ciphered/enciphered data section 243 and a ciphered/enciphered code section 241.

The electronic devices, for example, mobile handset 207, may also comprise a random access memory (RAM) 225, a provisioned data section 229, an operating system (OS) 219, a firmware 217, an update agent 213, and an update application (UA) loader 227. The provisioned data section 229 may also comprise an update application/agent (UA) provisioning information section 231 and a number assignment module 233.

In an embodiment according to the present invention, the update agent 213 may be adapted to employ the ciphering/enciphering and deciphering (encrypting and decrypting) components 235 to update firmware 217 and/or software (not shown) resident in the electronic device. At least a portion of the firmware 217 and/or software (not shown) may be enciphered and stored in encrypted section 237, as illustrated in FIG. 2.

An electronic device, for example, mobile handset 207, may comprise an update agent 213 adapted to decipher code and/or data segments and employ the deciphered code and/or data segments along with, and in conjunction with, contents of an update to update firmware 217 and/or software components, operating system (OS) 219, etc., resident in the mobile handset 207.

In an embodiment according to the present invention, the update generator 255 may be adapted to process an existing (old) memory image and a new memory image of the firmware/software in the electronic devices, for example, mobile handset 207. At least a portion of the firmware/software may be enciphered employing ciphering techniques, such as block ciphering techniques.

The update generator 255 may decipher the enciphered content (data segments and/or code) in both of the existing (old) and the new memory images to generate an update that may be used to update the firmware/software image in the electronic devices, for example, mobile handset 207.

The update generator 255 may also employ deciphering techniques to extract enciphered code and/or data segments, process the code and/or data segments to generate an update comprising difference information, and encipher the code and/or data segments, difference information, in an update.

Aspects of the present invention may also be found in including ciphered/enciphered information within a firmware image. In an embodiment according to the present invention, ciphering/enciphering scrambles messages and causes similar firmware images to become apparently un-correlated. In an embodiment according to the present invention, binary differencing techniques may also be used in creating the firmware/software updates.

Ciphering/enciphering may comprise scrambling information to hide the actual content from un-intended viewers. Several methodologies of ciphering/enciphering exist. One method of ciphering/enciphering firmware images is by applying symmetric ciphering/enciphering. Symmetric ciphering/enciphering may use one or multiple keys for both encryption and decryption. Symmetric ciphering/enciphering may be performed in at least the following two embodiments: stream symmetric ciphering/enciphering and block symmetric ciphering/enciphering.

Stream symmetric ciphering/enciphering may operate on information in a byte by byte manner. A key stream may be combined with a message to produce a ciphered/enciphered message. Stream symmetric ciphering/enciphering may be mathematically represented, for example, as follows:

$$C[i]=KS[i] \otimes M[i]; \text{ Encryption}$$

$$M[i]=KS[i] \otimes C[i]; \text{ Decryption}$$

For example, to encrypt a message according to the stream symmetric ciphering/enciphering method of an embodiment of the present invention, the $i^{th}$ byte of key stream KS may operate on a byte of message M to produce the $i^{th}$ cipher C, for example. To decrypt a message, the $i^{th}$ byte of key stream KS may operate on the $i^{th}$ cipher C to reproduce a byte of the message M, for example. Stream symmetric ciphering techniques are known to have been employed in general cryptography, however, stream symmetric ciphering techniques are not known to have been previously used in techniques of updating firmware/software in mobile electronic devices.

An example of stream symmetric ciphering used in general cryptography, for example, is RC4 (Ron's Code or Rivest's Cipher level 4). RC4 is a stream ciphering technology designed by Ronald Rivest for RSA Security™. RC4 is a variable key-size stream ciphering technique having byte-oriented operations. The algorithm for RC4 is based on the use of a random permutation. Analysis shows that the period of the cipher using RC4 is likely to be greater than $10^{100}$. Eight to sixteen machine operations are required per output byte using RC4. The RC4 cipher and corresponding algorithm are considered secure.

Block symmetric ciphering/enciphering, in contrast to stream symmetric ciphering/enciphering, may break the information into blocks of data, instead of bytes. The blocks may comprise 8-16 bytes, for example. A key block may be applied to a message to produce ciphered/enciphered text. In an embodiment according to the present invention, block symmetric ciphering/enciphering may be performed by cipher block chaining, for example. Block symmetric ciphering/enciphering may be mathematically represented, for example, as follows:

$$C[i]=E(K[i],M[i] \otimes C[i-1]); \text{ Encryption}$$

$$M[i]=D(KS[i],C[i]) \otimes C[i-1]; \text{ Decryption}$$

For example, using block symmetric ciphering/enciphering, the message data may be expanded to accommodate variable block size requirements. For example, large messages may be impacted (e.g., expanded) toward the end of the message. Block symmetric ciphering techniques are known to have been employed in general cryptography, however, block symmetric ciphering techniques are not known to have been previously used in techniques of updating firmware/software in mobile electronic devices.

Examples of block symmetric ciphering techniques used in general cryptography are DES (data encryption standard), 3DES (triple-DES) and RC2 (Ron's Code or Rivest's Cipher level 2). RC2 is a variable key-size block cipher designed by Ronald Rivest for RSA Security™. (RC stands for "Ron's Code" or "Rivest's Cipher"). RC2 is faster than DES and is designed as a "drop-in" replacement for DES. RC2 can be made more secure or less secure than DES against exhaustive key search by using appropriate key sizes. RC2 has a block size of 64 bits and is about two to three times faster than DES. An additional string (40 to 88 bits long) called a salt can be used to thwart attackers who try to precompute a large lookup table of possible encryptions. The salt may be appended to the encryption key. The lengthened key is used to encrypt the message. The salt is then sent, unencrypted, with the message.

The critical information in a firmware image, or a portion thereof, may be ciphered/enciphered. A ciphered/enciphered firmware image may comprise code and data segments. Image ciphering/enciphering may be useful for protecting information. A symmetric ciphering/enciphering algorithm and key may be stored in the electronic device.

Figure 3:
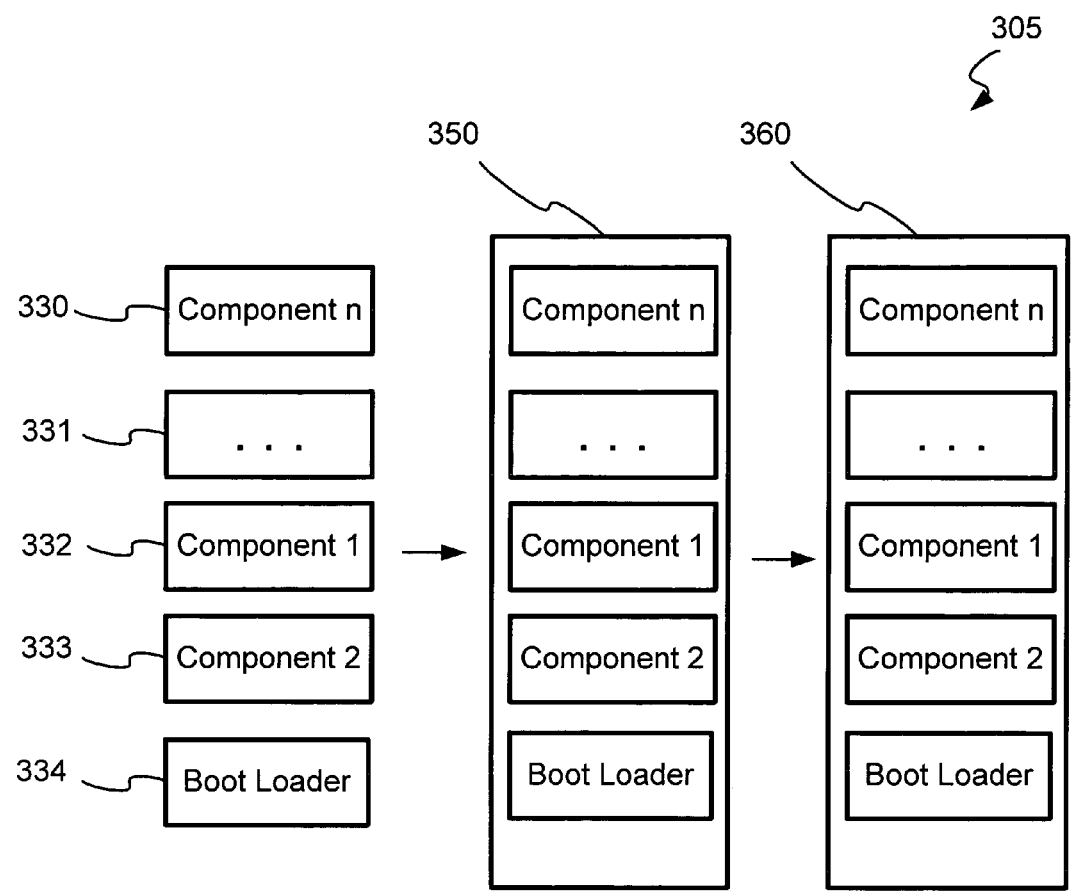
FIG. 3 is a block diagram illustrating a firmware build process incorporating ciphering according to an embodiment of the present invention.

FIG. 3 is a block diagram 305 illustrating a firmware build process incorporating ciphering/enciphering according to an embodiment of the present invention. FIG. 3 illustrates a process of building a firmware image 350 to be ciphered/enciphered incorporating a plurality of components, for example, component n 330, a component comprising an ellipsis 331 indicating that the firmware image comprises a plurality of additional component not shown, component 1 332, component 2 333, and boot loader 334. The component(s) to be ciphered/enciphered may be encrypted before assembling into an encrypted firmware image 360. If ciphering/enciphering keys change firmware build processes, the ciphered/enciphered component(s) of firmware images may become apparently un-correlated. Producing binary difference information between two firmware versions may be influenced by encryption, wherein the difference information may be masked due to firmware/software upgrade.

In an embodiment according to the present invention, an un-encrypted firmware image, for example firmware image 350, may be used while generating the binary difference. As the update is applied to the firmware image, the uncorrelated information may be decrypted.

Figure 4:
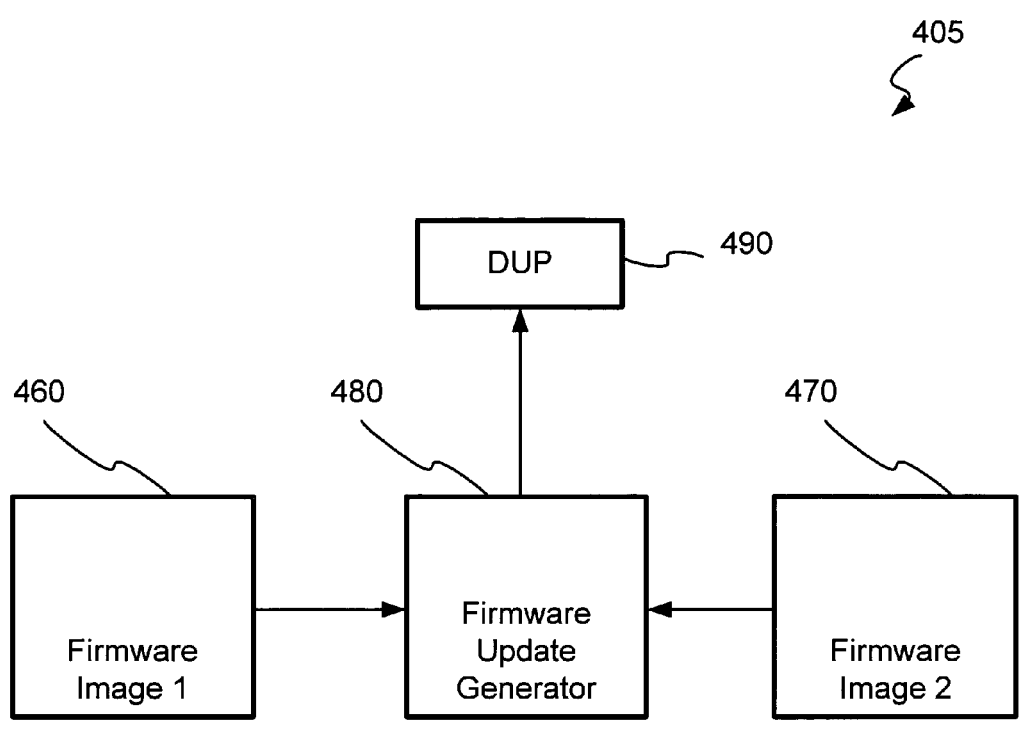
FIG. 4 is a block diagram illustrating a firmware update generator updating firmware images according to an embodiment of the present invention.

FIG. 4 is a block diagram 405 illustrating a firmware update generator 480 updating firmware images according to an embodiment of the present invention. In FIG. 4, at least two methods of generating an update using the firmware update generator 480 are illustrated. In an embodiment according to the present invention, one method may comprise creating an data update package (DUP) 490 based upon un-encrypted binary images, for example, firmware image 1 460 and firmware image 2 470 illustrated in FIG. 4, wherein additional information comprising ciphered/enciphered components may be used and included when ciphering/enciphering firmware images 1 and 2, 460 and 470, during update generation.

Symmetric ciphering/enciphering may have little or no impact on the final firmware image size. Stream symmetric ciphering/enciphering may produce ciphered/enciphered components having the same size as the un-encrypted components. Block symmetric ciphering, on the other hand, may introduce extra bytes at the end of the firmware images. The extra bytes may represent padding information, wherein the end of the message may not be aligned with a cipher block boundary. The firmware update generator 480 may be unaffected, because an encryption/decryption algorithm may be adapted to add/remove the padding information.

Figure 5:
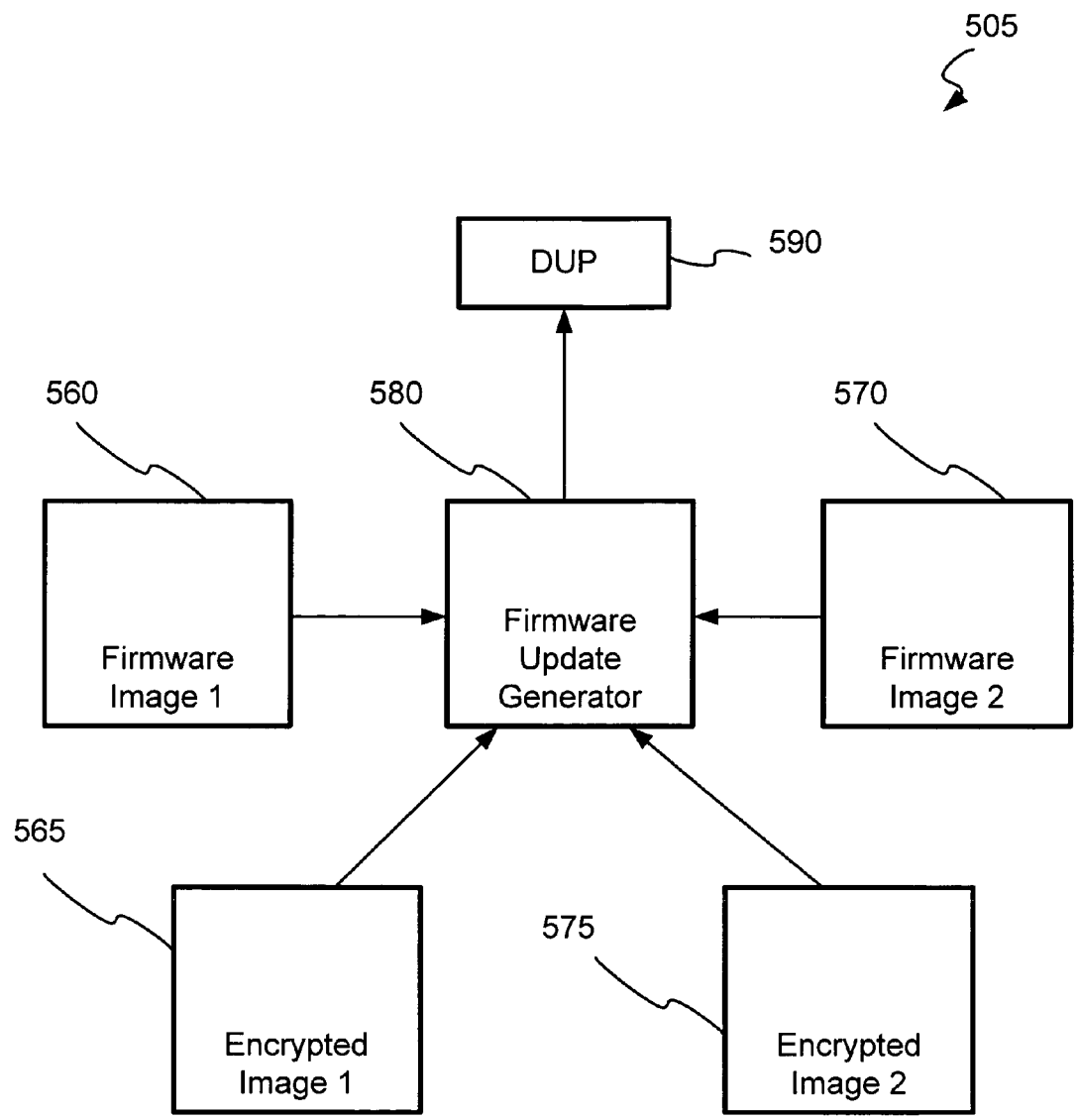
FIG. 5 is a block diagram illustrating a firmware update generator updating firmware images using ciphered firmware images according to an embodiment of the present invention.

FIG. 5 is a block diagram 505 illustrating a firmware update generator 580 updating firmware images, for example firmware image 1 560 and firmware image 2 570, using ciphered/enciphered (encrypted) firmware images, for example encrypted image 1 565 and encrypted image 2 575 according to an embodiment of the present invention. In order to perform ciphering/enciphering in an update agent in an electronic device, at least the following three issues may be addressed: handling ciphered/enciphering information during a pre-check phase; handling ciphered/enciphered information during a check-recovery phase; and handling ciphered/enciphered information using a fault tolerance procedure.

During the pre-check phase, the cyclic redundancy check (CRC) of a firmware image block may be compared against an original image CRC stored in the data update package (DUP) 590. When ciphered data is present, an approach to perform the pre-check may be for the block to be decrypted before the CRC is calculated.

In another embodiment according to the present invention, the CRC values for ciphered data may be stored in the DUP 590. However, in the firmware update generator, all images, ciphered/enciphered and un-encrypted, may be present during the data update package (DUP) generation stage.

The check-recovery phase may also perform a CRC comparison to determine the updated state applying the same processes used for the pre-check.

In the fault tolerance procedure, modifications may be performed, wherein a ciphering algorithm may be included to facilitate recovery of data for the update. Ciphering algorithm may comprise encryption, decryption, enciphering, deciphering, etc.

Figure 6:
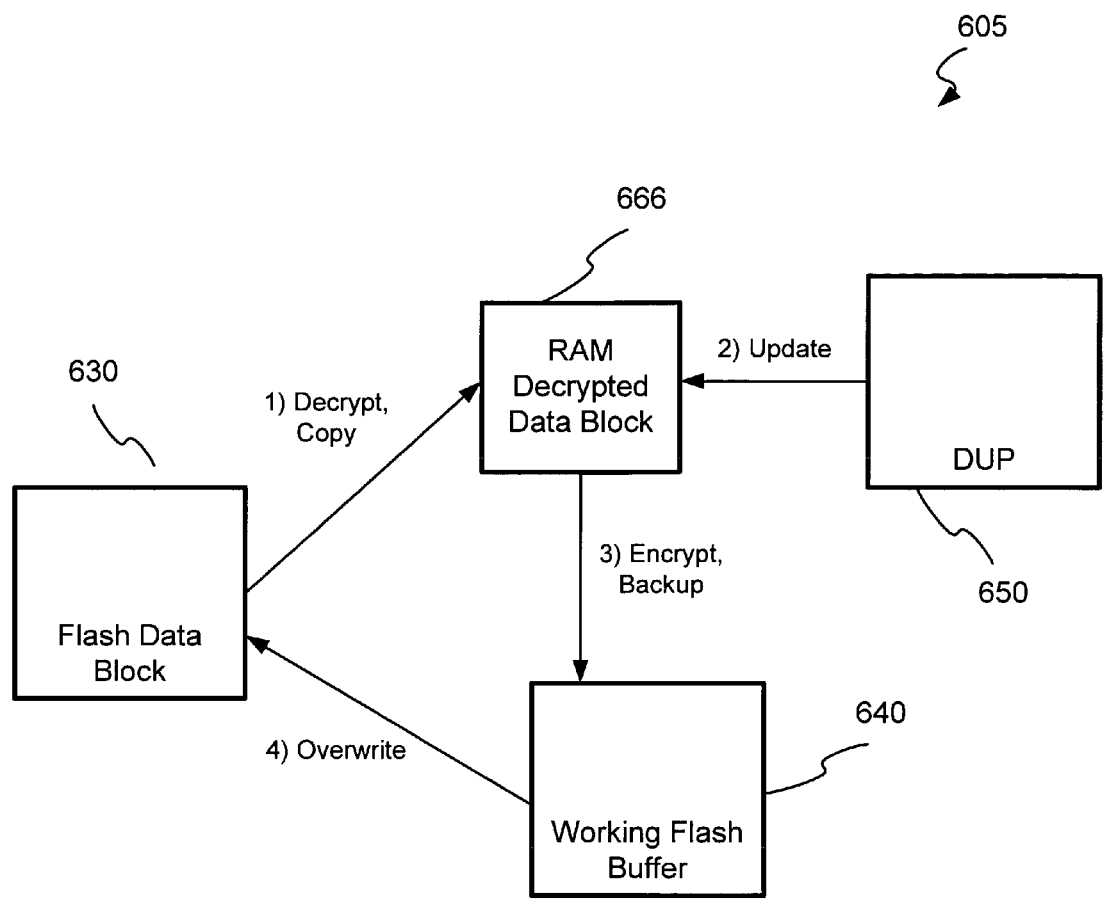
FIG. 6 is a block diagram illustrating a modified update agent fault tolerant update process managing ciphered firmware images according to an embodiment of the present invention.

FIG. 6 is a block diagram 605 illustrating a modified update agent fault tolerant update process managing ciphered firmware images according to an embodiment of the present invention. In FIG. 6, a flash data block 630, for example, may be decrypted and copied to RAM as a decrypted data block 666. The update code and/or data segments may be added from the data update package (DUP) 650 into the RAM, wherein the decrypted data block may be updated with the update information. The updated decrypted data block 666 may be encrypted and sent to a working flash buffer 640 for backup storage. The encrypted update may be sent to and overwritten into the original flash data block 630 as an updated data block. The process illustrated above may be repeated for every data block or data byte, depending upon the ciphering/enciphering method, to be updated.

Aspects of the present invention may be found in a fault tolerant update process. In an embodiment according to the present invention, because the original data block remains intact until the block is overwritten by an updated and encrypted update block, the original data block may be used, if necessary, in a re-initiated update process, if an error occurs during update processing. Additionally, the data update package also remains intact throughout the update process. If a processing failure or error occurs during the update process, the failure is recoverable and the process may be re-initiated without loss of the original data block or loss of the data update package.

Figure 7:
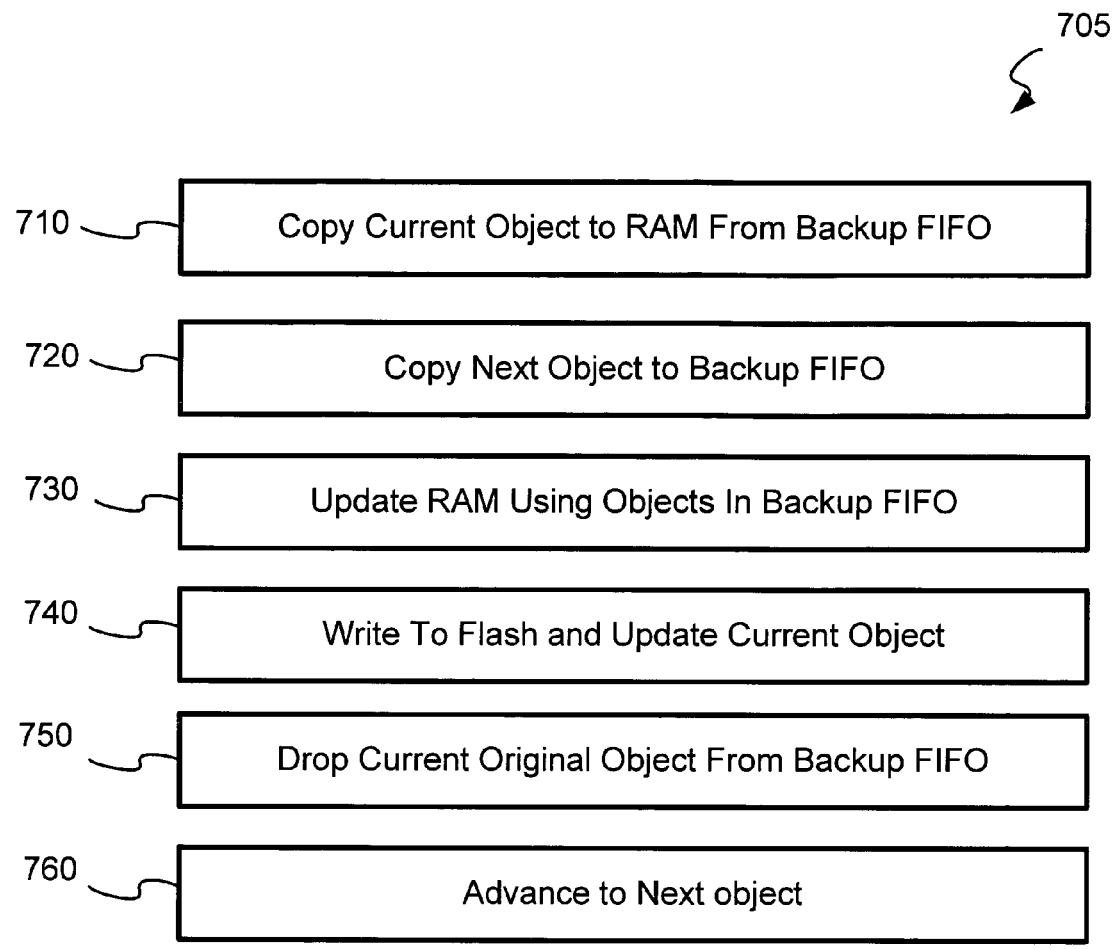
FIG. 7 is a flow diagram illustrating a method of updating firmware objects according to an embodiment of the present invention.

FIG. 7 is a flow diagram 705 illustrating a method of updating firmware objects according to an embodiment of the present invention. In FIG. 7, A current object to be updated may be copied to RAM from a backup FIFO 710. The next object to be updated may also be copied to the backup FIFO 720. The blocks in RAM may be updated using the objects in the back up FIFO 730. The object may be updated and written to flash memory 740. The current original block may be dropped from the backup FIFO 750. The update process may begin processing of the next object to be updated 760.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. An electronic device network for updating at least one of firmware and software in a plurality of electronic devices using at least one electronic device update, the network comprising:
   at least one update generator adapted to generate updates, the at least one update generator comprising an encrypting and decrypting engine;
   at least one update store storing a plurality of electronic device updates;
   at least one update delivery server adapted to dispense the plurality of electronic device updates; and
   wherein at least a portion of the at least one of firmware and software in the plurality of electronic devices is encrypted.

2. The network according to claim 1, wherein the at least one update delivery server comprises secure sockets layer support providing authentication and data encryption/decryption.

3. The network according to claim 1, wherein each of the plurality of electronic devices are adapted to retrieve secure encrypted updates from the at least one update delivery server to update the at least one of firmware and software resident in the plurality of electronic devices, and wherein at least a portion of the at least one of firmware and software resident in the electronic devices is encrypted.

4. The network according to claim 1, wherein each of the plurality of electronic devices comprise:
   one of encrypting and decrypting components; and
   a client for downloading updates.

5. The network according to claim 1, wherein each of the plurality of electronic devices comprise a security services component providing secure communication with the at least one update delivery server.

6. The network according to claim 1, wherein each of the plurality of electronic devices comprise an encrypted section, the encrypted section comprising at least one of an encrypted data section and an encrypted code section.

7. The network according to claim 1, wherein each of the plurality of electronic devices comprises at least one of a random access memory, a provisioned data section, an operating system, an update agent, and an update application loader, and wherein the provisioned data section comprises an update agent provisioning information section and a number assignment module.

8. The network according to claim 7, wherein the update agent is adapted to employ at least one of encrypting and decrypting components to update at least one of firmware and software resident in the electronic devices, and wherein at least a portion of the at least one of firmware and software is encrypted and stored in one of an encrypted data section and an encrypted code section.

9. The network according to claim 1, wherein the update generator is adapted to process an old memory image and a new memory image of the at least one of firmware and software in the electronic devices, and wherein at least a portion of the at least one of firmware and software is encrypted.

10. The network according to claim 1, wherein the update generator is adapted to decipher one of encrypted data segments and encrypted code in both an old memory image and a new memory image to generate an update for updating at least one of firmware and software in the electronic devices.

11. The network according to claim 1, wherein the update generator is adapted to employ deciphering techniques to extract one of enciphered code and enciphered data segments, process the one of enciphered code and enciphered data segments to generate an update comprising difference information, and encipher the one of code and data segments, and the difference information in at least one update.

12. The network according to claim 1, wherein the electronic devices comprise a plurality of mobile electronic devices, and wherein the plurality of mobile electronic devices comprise at least one of a mobile cellular phone handset, personal digital assistant, pager, a multimedia player, and a camera.

13. A method of encrypting update updating encrypted information within a firmware image in electronic devices, the method comprising:
   generating binary difference information using a first firmware image and a second firmware image, wherein one or both of the first and second firmware images are partially or entirely encrypted, and wherein generating comprises decrypting encrypted portions of the first and second firmware images;
   creating an encrypted update for an electronic device using the binary differencing information; and
   encrypting firmware images by applying at least one of stream symmetric enciphering and block symmetric enciphering.

14. The method according to claim 13, wherein stream symmetric enciphering is performed in a byte by byte manner, wherein update information is processed using a key stream to produce an encrypted update.

15. The method according to claim 14, wherein stream symmetric enciphering further comprises an $i^{th}$ byte of the key stream operating on a byte of the update information produce an $i^{th}$ cipher encrypted byte.

16. The method according to claim 15, wherein the $i^{th}$ cipher encrypted byte is decrypted by the $i^{th}$ byte of the key stream operating on the $i^{th}$ cipher encrypted byte to reproduce an original $i^{th}$ byte of update information.

17. The method according to claim 13, wherein block symmetric enciphering is performed upon blocks of data, wherein the blocks of data comprise a predetermined number of bytes, wherein a key block is applied to an update information block to produce an encrypted block, and wherein block symmetric enciphering is performed by cipher block chaining.

18. The method according to claim 17, wherein the predetermined number of bytes in the blocks of data comprises 8-16 bytes.

19. The method according to claim 17, wherein block symmetric enciphering is enabled to accommodate variable block sizes, wherein block sizes are at least one of expanded and padded, wherein padding is one of added and removed to vary the block sizes during a ciphering process.

20. The method according to claim 13, wherein an enciphering algorithm and an enciphering key are stored in the electronic devices.

21. The method according to claim 13, wherein the electronic devices comprise a plurality of mobile electronic devices, and wherein the plurality of mobile electronic devices comprise at least one of a mobile cellular phone handset, personal digital assistant, pager, multimedia player, and a camera.

22. An electronic device employing one of encrypting and decrypting techniques to update firmware and software, the electronic device comprising:
    random access memory; and
    non-volatile memory, the non-volatile memory comprising:
        an update agent;
        a first in first out (FIFO) memory device;
        a firmware;
        a software application; and
        an update, wherein the electronic device is adapted to update an encrypted portion of at least one of the firmware and the software application selected for updating, and wherein updating at least one of the firmware and the software application comprises decrypting the encrypted portion.

23. The electronic device according to claim 22, wherein the at least one of the firmware and the software application selected for updating in the electronic device are at least partially encrypted.

24. The electronic device according to claim 22, wherein the electronic device is adapted to retrieve secure encrypted updates from an update delivery server to update at least one of the firmware and the software application selected for updating resident in the electronic device.

25. The electronic device according to claim 22, wherein the electronic device comprises at least one of encrypting and decrypting components and a client for facilitating downloading updates.

26. The electronic device according to claim 22, wherein the electronic device comprises a security services component providing secure communication with an update delivery server.

27. The electronic device according to claim 22, wherein the electronic device comprises an encrypted section, the encrypted section comprising at least one of an encrypted data section and an encrypted code section.

28. The electronic device according to claim 22, wherein the electronic device further comprises at least one of a provisioned data section, an operating system, an update agent, and an update application loader, the provisioned data section comprising an update agent provisioning information section and a number assignment module.

29. The electronic device according to claim 28, wherein the update agent is adapted to employ at least one of encrypting and decrypting components to update at least one of firmware and software application resident in the electronic device, and wherein at least a portion of the at least one of firmware and software application is encrypted and stored in one of an encrypted data section and an encrypted code section.

30. The electronic device according to claim 22, wherein the electronic device comprises a plurality of mobile electronic devices, and wherein the plurality of mobile electronic devices comprise at least one of a mobile cellular phone handset, personal digital assistant, pager, multimedia player, and a camera.

31. A method of building a firmware upgrade for use in an electronic device incorporating encryption, the method comprising:
    building a firmware image to be encrypted, the firmware image comprising a plurality of components; and
    encrypting the components before assembling the components into an encrypted firmware image.

32. The method according to claim 31, further comprising:
    generating binary difference information between firmware versions undergoing an upgrade; and
    using an un-encrypted firmware image to generate the binary difference information, wherein as the upgrade is being applied to an encrypted firmware image, uncorrelated information is decrypted.

33. The method according to claim 31, further comprising creating a data update package, the data update package being based upon un-encrypted binary images.

34. The method according to claim 31, further comprising creating a data update package, the data update package being based upon encrypted binary images.

35. The method according to claim 31, further comprising at least one of:
    managing encrypted information by performing a pre-check analysis;
    managing encrypted information by performing a check-recovery analysis; and
    managing encrypted information by performing a fault tolerant procedure.

36. The method according to claim 35, wherein during at least one of the pre-check analysis and the check recovery analysis, a cyclic redundancy check of a firmware image block is compared against an original image cyclic redundancy check stored in a data update package, wherein when ciphered data is present, the pre-check analysis is performed upon the block to be decrypted before the cyclic redundancy check is calculated.

37. The method according to claim 36, wherein cyclic redundancy check values for ciphered data are stored in the data update package.

38. The method according to claim 35, wherein during the fault tolerant procedure a ciphering algorithm is applied to facilitate recovery of data for the upgrade.

39. The method according to claim 31, further comprising:
    decrypting an original data block and copying the decrypted data block to random access memory;
    applying update information to the random access memory, the update information comprising at least one of an update code and an update data segment from a data update package;
    updating the decrypted data block with the update information to form an updated decrypted data block;
    encrypting the updated decrypted data block to form an encrypted updated data block;
    sending the encrypted updated data block to a storage unit;
    overwriting the original data block with the encrypted updated data block; and
    processing every data block to be updated during an upgrade.

40. The method according to claim 39, further comprising a fault tolerant upgrade, the fault tolerant upgrade at least comprising:
    maintaining each original data block intact until the original data block is overwritten by an encrypted updated data block; and
    maintaining a data update package intact throughout the fault tolerant upgrade.

41. The method according to claim 31, wherein the electronic device comprises a plurality of mobile electronic devices, and wherein the plurality of mobile electronic devices comprise at least one of a mobile cellular phone handset, personal digital assistant, pager, multimedia player, and a camera.

* * * * *

UNITED STATES PATENT AND TRADEMARK OFFICE
CERTIFICATE OF CORRECTION

PATENT NO. : 7,975,147 B1
APPLICATION NO. : 10/813212
DATED : July 5, 2011
INVENTOR(S) : Iyad Qumei It is certified that error appears in the above-identified patent and that said Letters Patent is hereby corrected as shown below:

In column 12, line 15, in Claim 13, after "of" delete "cncrypting update".

Signed and Sealed this
Tenth Day of January, 2012

David J. Kappos
*Director of the United States Patent and Trademark Office*